United States Patent
Dibdin (10) Patent No.: US 9,199,568 B2
(45) Date of Patent: Dec. 1, 2015

(54) LOAD HANDLING APPARATUS FOR HANDLING GOODS IN VEHICLE

(75) Inventor: Thomas Peter Dibdin, Scunthorpe (GB)

(73) Assignee: Middlegate Marketing Limited, Scunthorpe (GB)

( * ) Notice: Subject to any disclaimer, the term of this patent is extended or adjusted under 35 U.S.C. 154(b) by 335 days.

(21) Appl. No.: 13/702,335

(22) PCT Filed: Jun. 7, 2011

(86) PCT No.: PCT/EP2011/059404
§ 371 (c)(1), (2), (4) Date: Aug. 26, 2013

(87) PCT Pub. No.: WO2011/154410
PCT Pub. Date: Dec. 15, 2011

(65) Prior Publication Data
US 2013/0322998 A1    Dec. 5, 2013

(30) Foreign Application Priority Data

Jun. 8, 2010   (GB) .................................... 1009572.7
Jun. 10, 2010  (EP) ..................................... 10165478

(51) Int. Cl.
*B65G 69/00*   (2006.01)
*B60P 1/02*    (2006.01)

(52) U.S. Cl.
CPC ....................................... *B60P 1/02* (2013.01)

(58) Field of Classification Search
CPC .............. B60P 1/02; B60P 1/44; B60P 1/025; B60P 1/4414; B60P 1/4421; B60P 1/4435; B60P 1/4442; B60P 1/38

USPC ............................... 414/679; 410/24, 26, 29.1
See application file for complete search history.

(56) References Cited

U.S. PATENT DOCUMENTS

| | | | | |
|---|---|---|---|---|
| 3,591,246 A | * | 7/1971  | Adams        | 312/306  |
| 4,701,086 A | * | 10/1987 | Thorndyke    | 410/26   |
| 5,443,350 A | * | 8/1995  | Wilson       | 414/495  |
| 6,435,785 B1| * | 8/2002  | Heger et al. | 410/29.1 |
| 7,416,378 B1|   | 8/2008  | Adams        |          |
| 8,353,661 B2| * | 1/2013  | Morasse      | 414/462  |

(Continued)

FOREIGN PATENT DOCUMENTS

| | | |
|---|---|---|
| DE | 19860703 A1    | 7/2000  |
| DE | 20308990 U1    | 8/2003  |
| DE | 102007029346 A1| 1/2009  |
| EP | 1471594 A1     | 10/2004 |
| GB | 2395695 A      | 6/2004  |

OTHER PUBLICATIONS

Patent Cooperation Treaty, International Search Report, International Application No. PCT/EP2011/059404, dated Jul. 6, 2011.

(Continued)

*Primary Examiner* — Saul Rodriguez
*Assistant Examiner* — Mark Hageman
(74) *Attorney, Agent, or Firm* — Kilpatrick Townsend & Stockton LLP (57) ABSTRACT

A load handling apparatus for handling goods in a vehicle is disclosed. The apparatus comprises a support (34) adapted to support a platform having goods (4) located thereon and the support is adapted to be mounted to the interior of the vehicle and to be moveable between a loading position and a transport position while supporting the platform.

11 Claims, 14 Drawing Sheets

(56) References Cited

U.S. PATENT DOCUMENTS

2007/0274799 A1* 11/2007 Dibdin et al. .................. 410/30
2008/0001130 A1* 1/2008 Dibdin ..................... 254/93 HP

OTHER PUBLICATIONS

Patent Cooperation Treaty, Written Opinion, International Application No. PCT/EP2011/059404, dated Jul. 6, 2011.

* cited by examiner

LOAD HANDLING APPARATUS FOR HANDLING GOODS IN VEHICLE

The present invention relates to a load handling apparatus for handling goods in a vehicle, and relates particularly, but not exclusively, to a load handling apparatus for handling goods in a goods trailer. The invention also relates to a vehicle incorporating such load handling apparatus.

In order to maximise the carrying capacity of a goods trailer, it is known to lower the base of the trailer between its rear axle and front hitch in order to form a well in which additional goods can be stored.

WO 2004/071806 discloses a trailer of this type in which goods are stacked on a platform over the well, the platform initially forming part of the trailer floor, and then the platform and goods are lowered to the bottom of the well by means of a suitable lifting mechanism. Further goods are then stacked on top of the goods located in the well, by loading the further goods onto a platform at the rear of the trailer, which is then raised to an intended storage height and then moved forwards relative to the trailer along rails located in the walls of the trailer to locate the platform and the goods it supports on top of the goods in the well.

This arrangement suffers from the drawback that because the platform slides along rails located in the walls of the trailer, goods located on the platform can come into direct contact with the trailer walls. In the event that goods located on the platform in the transport position above the trailer well move during transport and come into contact with the sidewalls of the trailer, this causes the disadvantage that there is a risk of damage to the goods when the platform is moved rearwards in order to unload the goods from the platform.

Preferred embodiments of the present invention seek to overcome the above disadvantage of the prior art.

According to an aspect of the present invention, there is provided a load handling apparatus for handling goods in a vehicle, the apparatus comprising a support adapted to support a platform having goods located thereon and comprising first engaging means adapted to engage second engaging means provided on the platform to enable the support to support the platform and goods located thereon, wherein the support is adapted to be mounted to the interior of a vehicle and to be moveable between a loading position and a transport position while supporting said platform.

By supporting the platform on a support which is in turn moveably mounted to the vehicle, this provides the advantage of enabling direct contact between goods supported on the platform and the internal wall of the vehicle to be avoided. This in turn minimises the risk of damage, during movement of the support from the transport to the loading position, to goods supported on the platform which may have moved during transport.

The support may include a pair of sidewalls.

This provides the advantage of minimising contact between goods located on the platform and the internal walls of the vehicle in the transport position.

The first engaging means may include at least one recess for receiving a respective protrusion provided on the platform.

At least one said recess may include an inclined surface for engaging a respective protrusion provided on the platform to enable disengagement of said first and second engaging means from each other by means of movement of the platform relative to the support.

At least one said recess may include a respective abutment portion for retaining said first and second engagement means in engagement with each other in the transport position of the support.

The apparatus may further comprise drive means for enabling movement of the support relative to the vehicle between the loading position and the transport position.

The drive means may include a rack and pinion gear mechanism.

The rack and pinion gear mechanism may include a plurality of spaced apart pinion gears on a common shaft.

This provides the advantage of providing a simplified mechanism enabling smooth sliding movement of the support relative to the vehicle.

The apparatus may further comprise a first platform for supporting goods thereon and comprising second engaging means adapted to engage said first engaging means, wherein said platform is adapted to be (i) moved from a first position adjacent a floor of the vehicle, in which goods can be loaded onto or unloaded from the platform, to a second position in which said first engaging means engages said second engaging means to enable the platform to be supported by the support while the support moves to the transport position, and (ii) disengaged from said support in said second position and moved to said first position.

The second engaging means may include at least one protrusion biased outwardly of said platform.

This provides the advantage of enabling easy engagement and disengagement of the first and second engaging means from each other.

The apparatus may further comprise a second platform adapted to be moved with the first platform when the first platform is moved from said first position to said second position, and to be disengaged from said first platform when the first platform is supported by the support.

This provides the advantage of enabling the second platform to form part of the floor of the vehicle and support additional goods thereon when the first platform is supported by the support, and to enable easy movement of the first platform between the first and second positions and engagement and disengagement of the first platform and the support by means of a suitable lifting device, such as an airbag lifting device.

According to another aspect of the present invention, there is provided a vehicle comprising a vehicle body and a load handling apparatus as defined above mounted to the interior of the vehicle body and moveable between said loading position and said transport position.

A preferred embodiment of the invention will now be described, by way of example only and not in any limitative sense with reference to the accompanying drawings, in which.

Referring to FIGS. 1 to 4, a goods trailer 2 of a first embodiment of the present invention for supporting goods on pallets 4 includes a trailer body 6 having rear axles 8 and a front hitch 10. The internal space of the trailer 2 is divided in to a front compartment 12, a middle compartment 14 having a goods well 16 between the rear axles 8 and the front hitch 10, and a rear compartment 18. The front 12 and middle 14 compartments are separated by a first gate 20 for keeping the pallets 4 in position in the respective compartments 12, 14, and the middle 14 and rear 18 compartments are similarly separated by a second gate (not shown).

Figure 8:
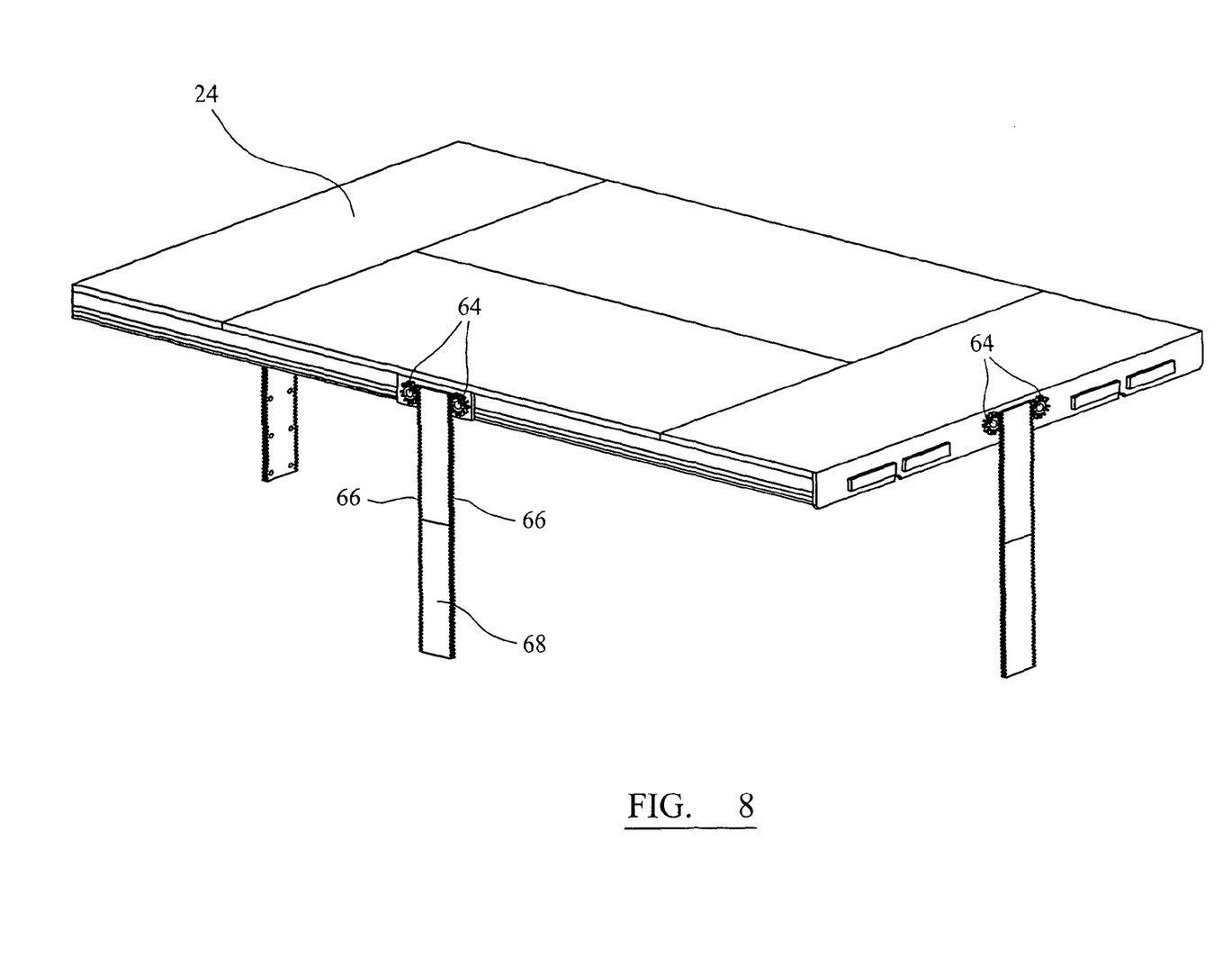
FIG. 8 is a perspective view from above of a well deck of the trailer of FIGS. 1 to 4 together with a levelling apparatus for use therewith.
Figure 9:
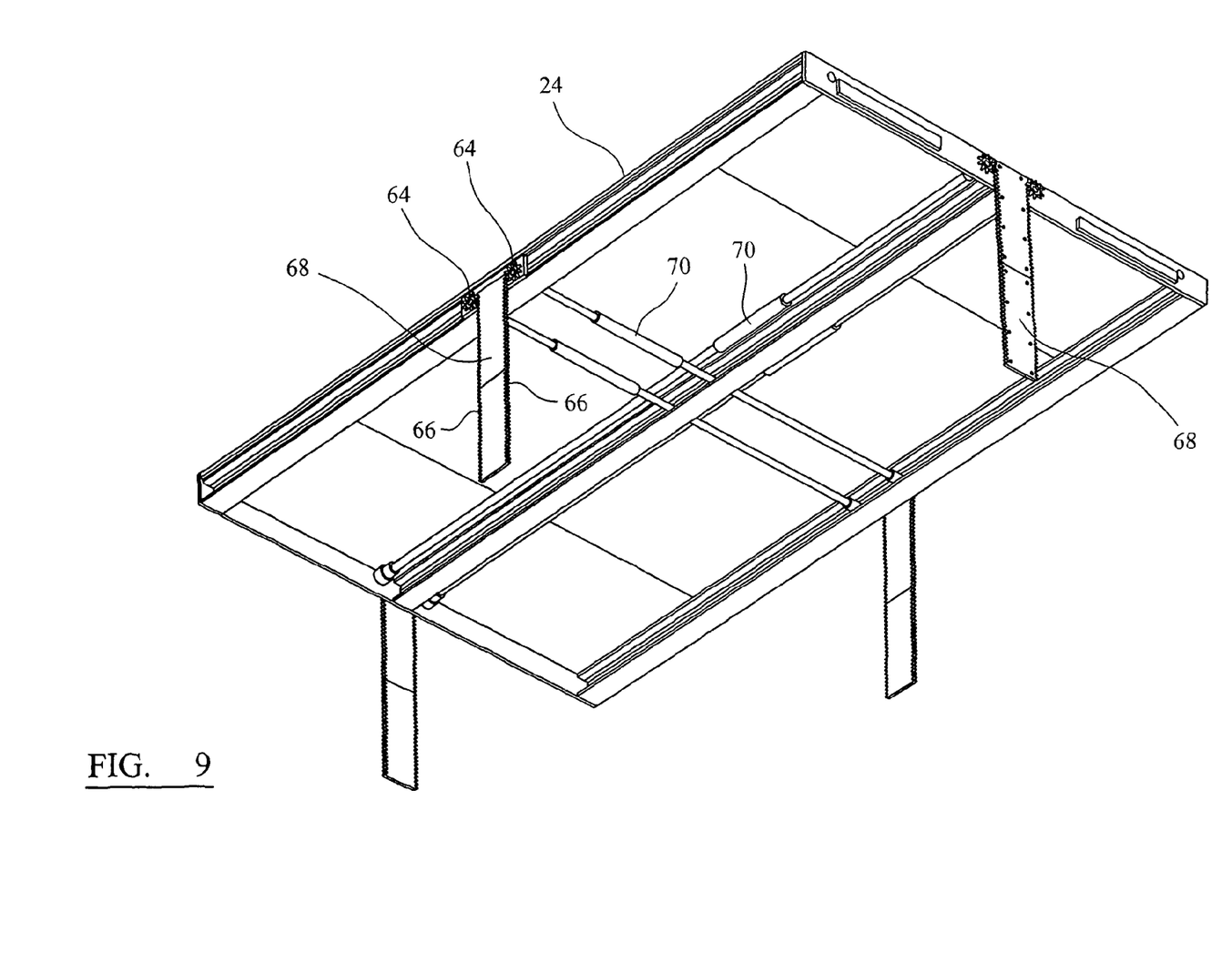
FIG. 9 is a perspective view from below of the well deck and levelling mechanism of FIG. 8.

A first inflatable airbag lifting apparatus 22 is located in the goods well 16 for raising and lowering a well deck 24 (shown in greater detail in FIGS. 8 and 9) forming a floor of the middle compartment 14, and a second airbag apparatus 26 (FIG. 2) is located below a rear deck assembly 28 (shown in greater detail in FIG. 10), comprising a first platform 30 and a second platform 32. The second airbag apparatus 26 raises and lowers the first 30 and second 32 platforms within a support 34 slidably mounted to support rails 36 on the internal walls of the trailer 2. The construction of the first 22 and second 26 airbag lifting apparatus is described in WO 2006/027558, and will not be described in further detail herein.

Figure 5:
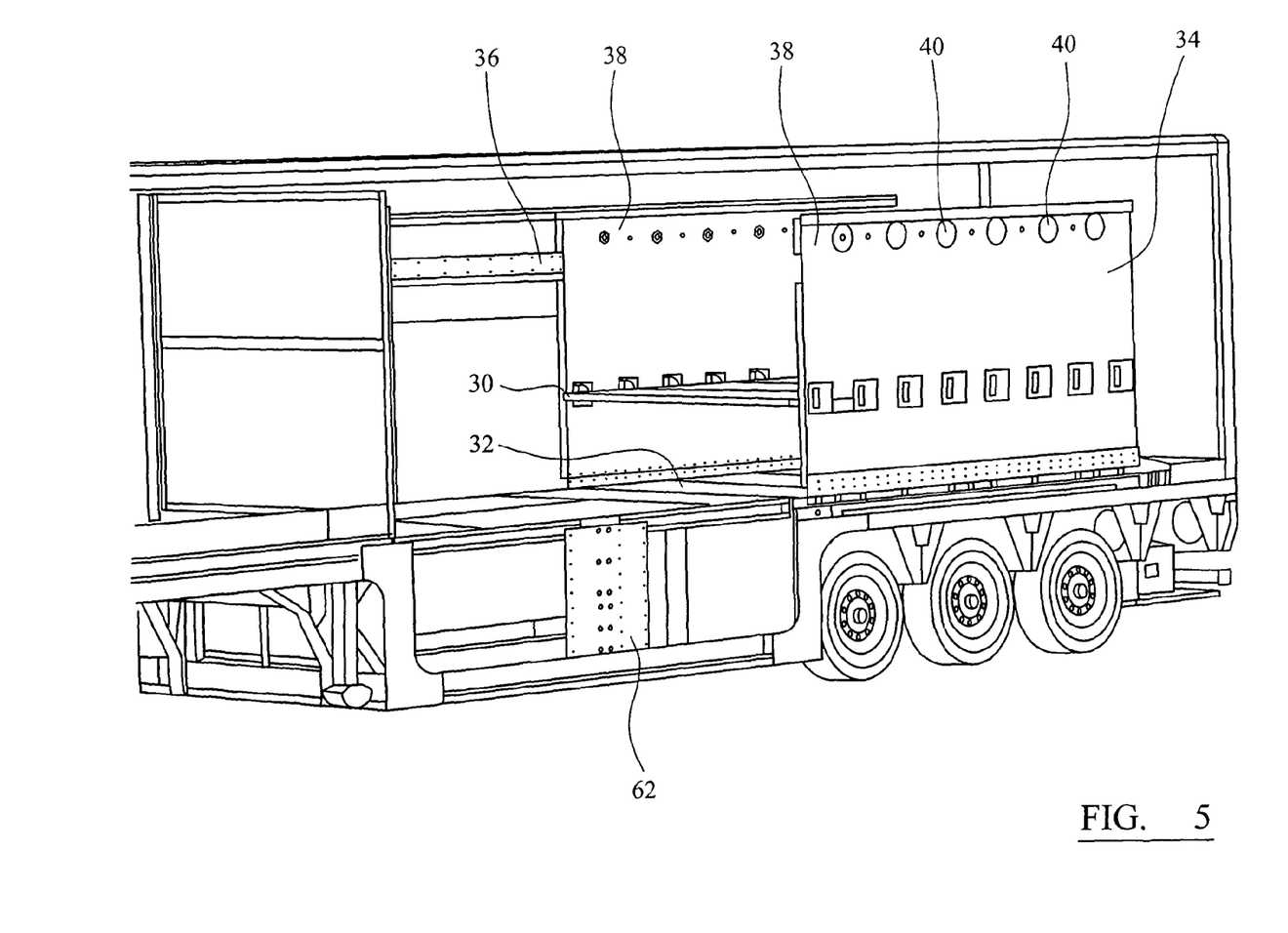
FIG. 5 is a partially cut-away perspective view of part of the trailer of FIGS. 1 to 4.
Figure 7:
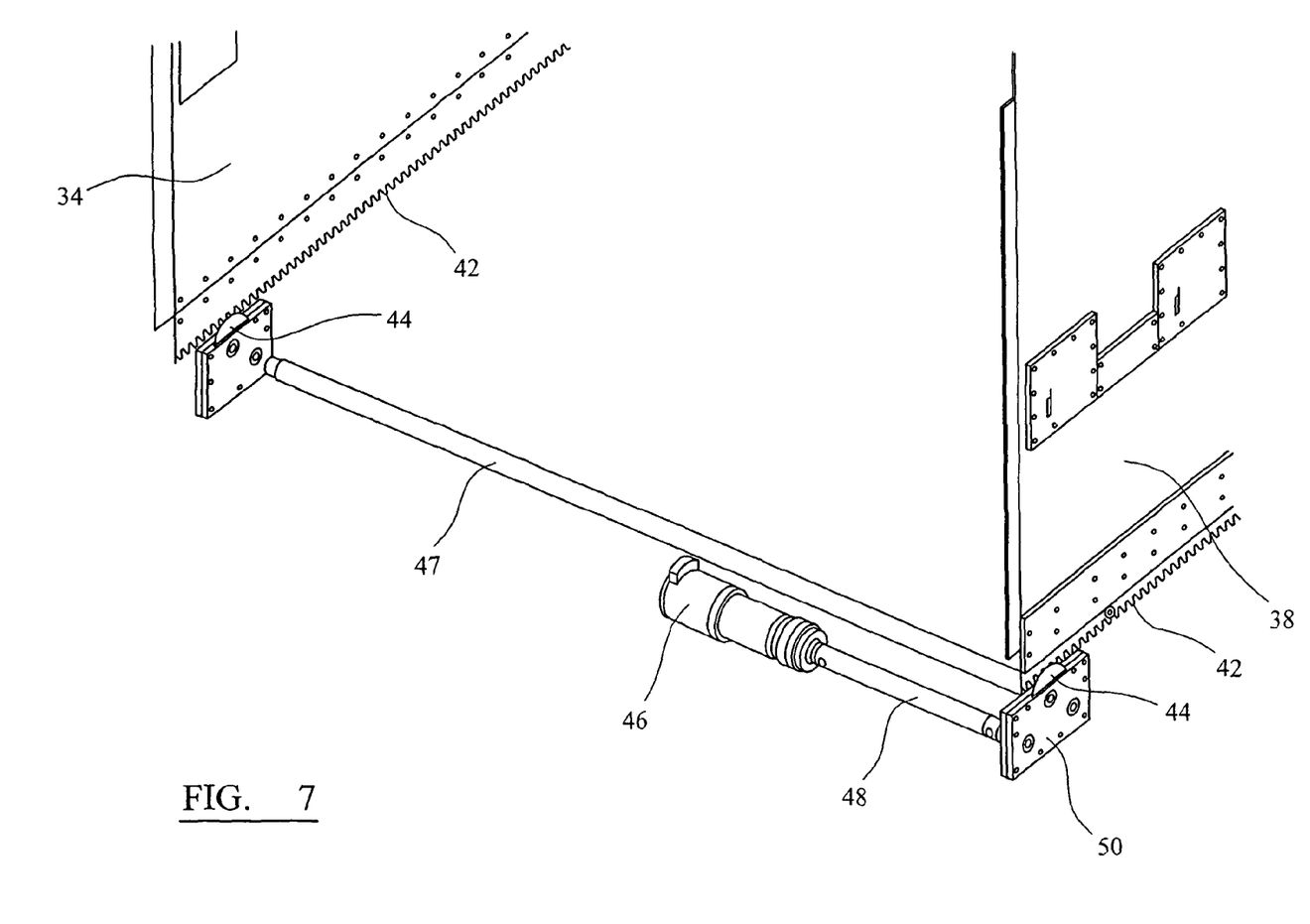
FIG. 7 is a perspective view of a drive mechanism for the support of FIG. 6.

Referring to FIG. 5, the support 34 has vertical sidewalls 38 spaced apart by suitable supports (not shown) and is slidably mounted to the tracks 36 on the internal surface of the sidewalls of the vehicle 2 by means of suitable rollers 40. As shown in greater detail in FIG. 7, the lower edge of each sidewall 38 of the support is provided with a rack gear 42 which engages with corresponding pinion gears 44, which are mounted on a common shaft 47 for common rotation, such that rotation of one pinion gear 44 produces an equal amount of rotation in the other pinion gear 44. This ensures that both sides of the support 34 are driven at the same speed to ensure smooth sliding of the support 34 relative to the trailer body 6, thus avoiding so-called "crabbing", in each side of the support 34 is alternately allowed to move slightly relative to the other side. One of the pinion gears 44 is driven by means of a drive motor 46 through a drive shaft 48 and gear train 50.

Figure 6:
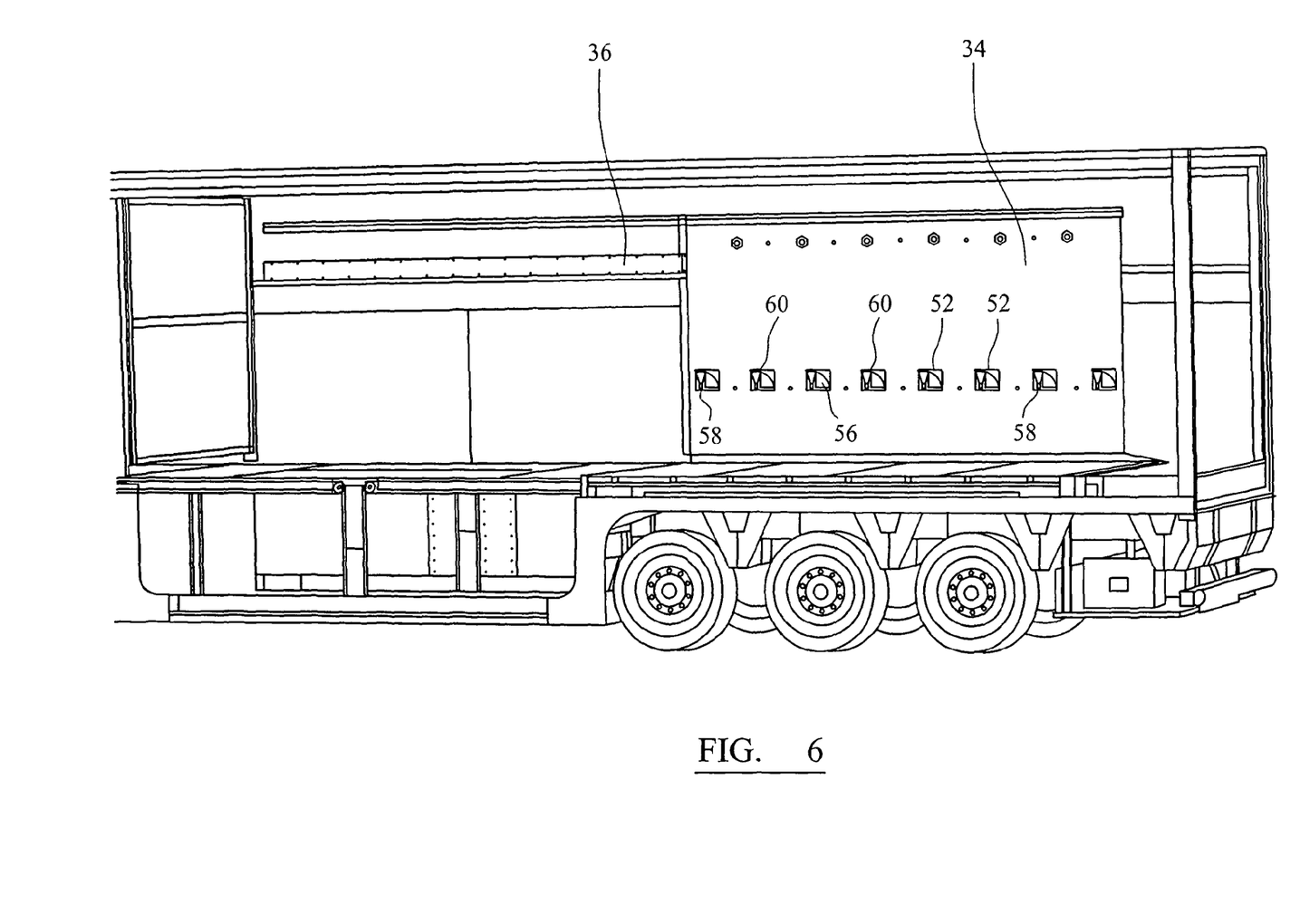
FIG. 6 is a partially cut-away side view of the part of the trailer of FIG. 5, showing an internal wall of a support.

Referring to FIG. 6, each internal sidewall 38 of the support 34 is provided with first engaging means in the form of a row of recessed plates 52 for receiving corresponding spring loaded pins 54 (FIG. 10) protruding from side edges of the upper deck 30 of rear deck assembly 28. The recessed plates 52 are provided with respective recesses having inclined surfaces 56 for engaging an end of respective spring loaded pins 54 such that as the upper platform 30 is moved upwards relative to the support 34, the pins 54 can move outwards of the upper platform 30, and slight rearward movement of the support 34 relative to the platform 30 enables the pins 54 to be located in deeper parts 58 of the recesses behind respective protrusions 60 in the plates 52 to prevent disengagement of the pins 54 from the plates 52 unless the upper platform 30 is lifted relative to the plates 52 and the support 34 moved forwards relative to the upper platform 30.

Referring to FIGS. 5 and 6 and FIGS. 8 and 9, the goods well 16 located between the rear axles 8 and front hitch 10 is provided with side plates 62 for preventing goods supported on the well deck 24 in its lowered position (FIGS. 2 to 4) from coming into contact with the sidewalls of the vehicle 2. This in turn minimise the risk of damage to goods on the well deck 24 when the well deck 24 is raised to unload it. The well deck 24 is provided with pairs of pinion gears 64 (FIG. 8) located at each of its edges and which engage opposite rack gear surfaces 66 on respective edges of rack gears 68 mounted in the well 16, the pinion gears 64 being arranged in pairs on opposite ends of respective common axles 70 (FIG. 9), so that movement of one pinion gear 64 along the corresponding rack gear 68 causes equal rotation of the corresponding coaxial pinion gear 64, as a result of which movement of one side of the well deck 24 along the corresponding rack gear 68 causes equal movement of the other side of the well deck 24 along the oppositely arranged rack gear 68 to maintain the well deck 24 in a horizontal orientation.

Figure 10:
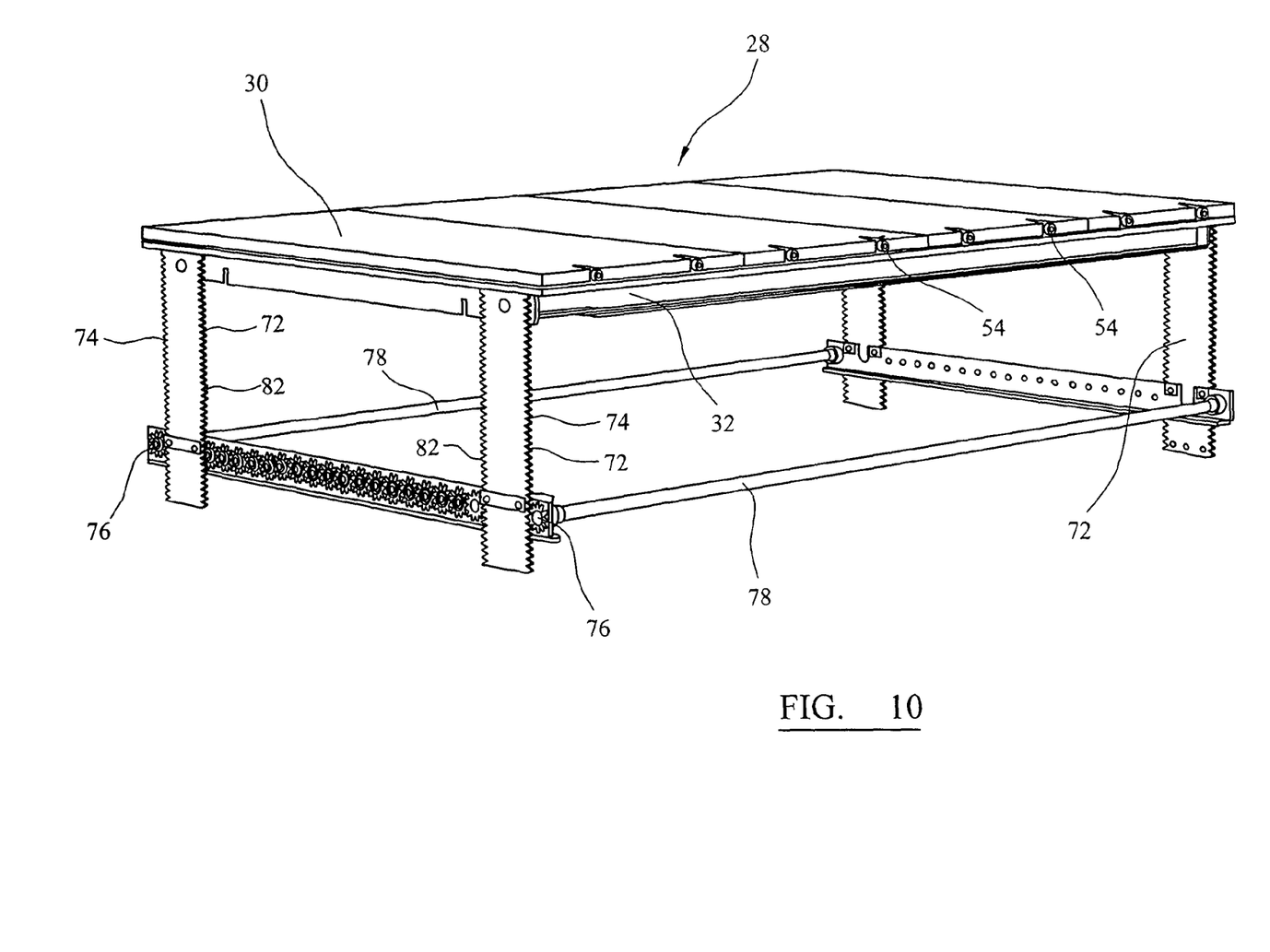
FIG. 10 is a perspective view of a rear deck assembly of the trailer of FIGS. 1 to 4 together with a levelling apparatus for use therewith.

Similarly, referring to FIG. 10, pairs of rack gears 72 extend from front and rear ends of the lower platform 32 of the rear deck assembly 28. Each rack gear 72 has a first rack gear surface 74 engaged by pairs of pinion gears 76 arranged in pairs on opposite ends of respective common axles 78 which are fixed relative to the vehicle 2. The pinion gears 76 are mounted for common rotation so that rotation of one pinion gear 76 causes an equal amount of rotation of the corresponding coaxial pinion gear 76, so that movement of the front edge of the lower platform 32 along one rack gear 72 causes an equal amount of movement of the other end of the lower platform 32 along the corresponding rack gear 72. The pinion gears 76 are maintained in contact with the first rack gear surfaces 74 by means of gear trains 80 extending between oppositely arranged second rack gear surfaces 82 of the rack gears 72. As a result, the pinion gears 76 can be held in engagement with the rack gears 72 in a simple manner without the use of an excessive number of components. In this way, during raising and lowering of the rear deck assembly 28, movement of one pinion gear 76 relative to the corresponding rack gear produces an equal movement of the corresponding coaxially mounted pinion gear 76 to maintain front and rear ends of the rear deck assembly at the same height, while at the same time causing equal and opposite movement of the opposite pair of coaxially mounted gears 76 via the gear train 80, to maintain opposite lateral sides of the deck assembly 28 at the same height.

Referring now to FIGS. 1 to 4, a loading operation of the vehicle 2 will now be described.

In order to begin the loading process, the first airbag apparatus 22 is inflated under the control of a suitable controller (not shown) to lift the well deck 24 to a position in which it forms part of the floor of the vehicle 2. Goods on pallets 4 are then loaded into the front compartment 12 and then the first gate 20 is closed. Goods are then loaded into the middle compartment 14 and stacked on the upper platform 30 of the rear deck assembly 28, i.e. between the sidewalls 38 of the support 34 to give the arrangement shown in FIG. 1.

Figure 1:
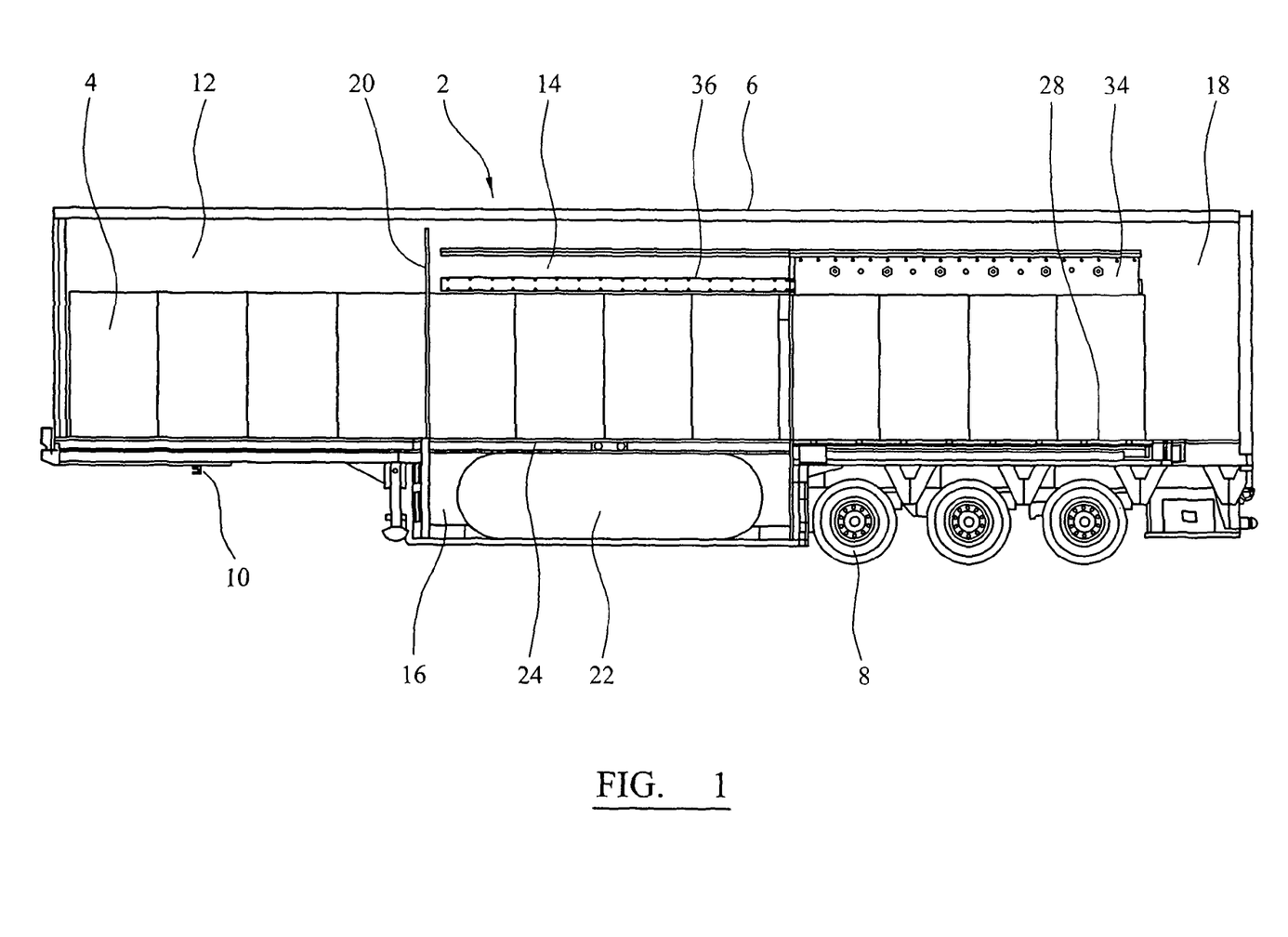
FIGS. 1 to 4 show schematic cross sectional side views of a loading sequence of a vehicle trailer of a first embodiment of the present invention.
Figure 2:
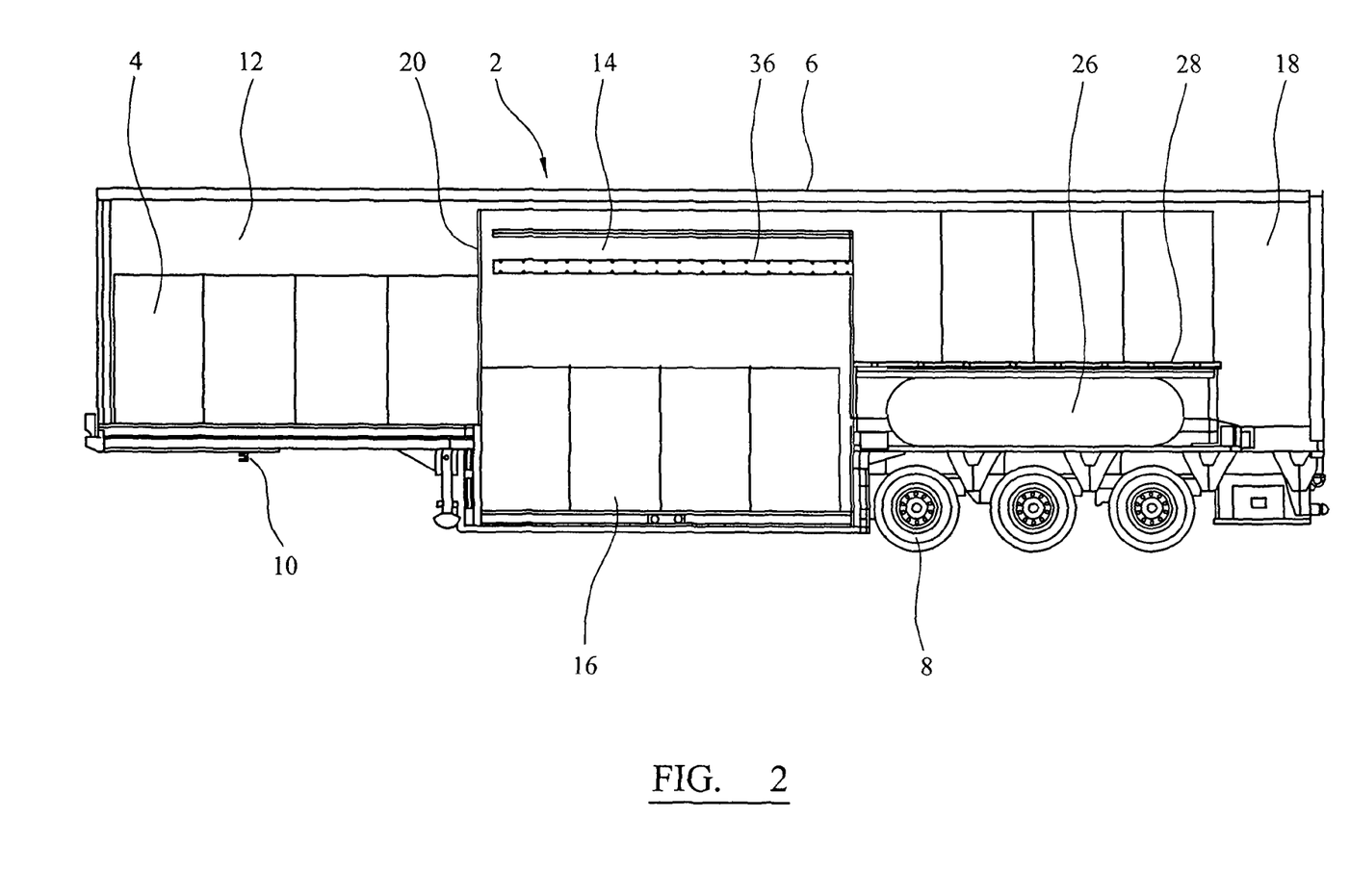
Figure 3:
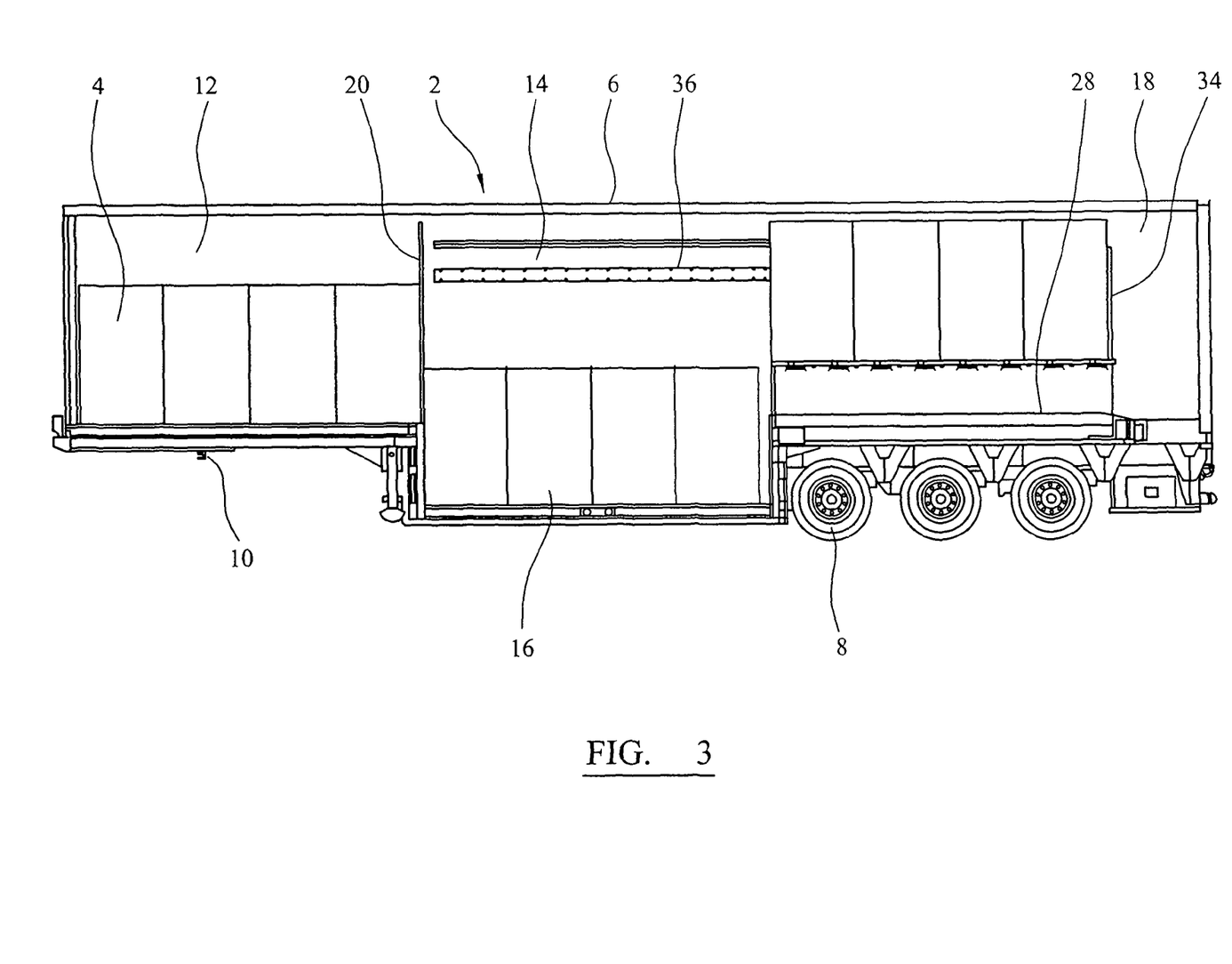
Figure 4:
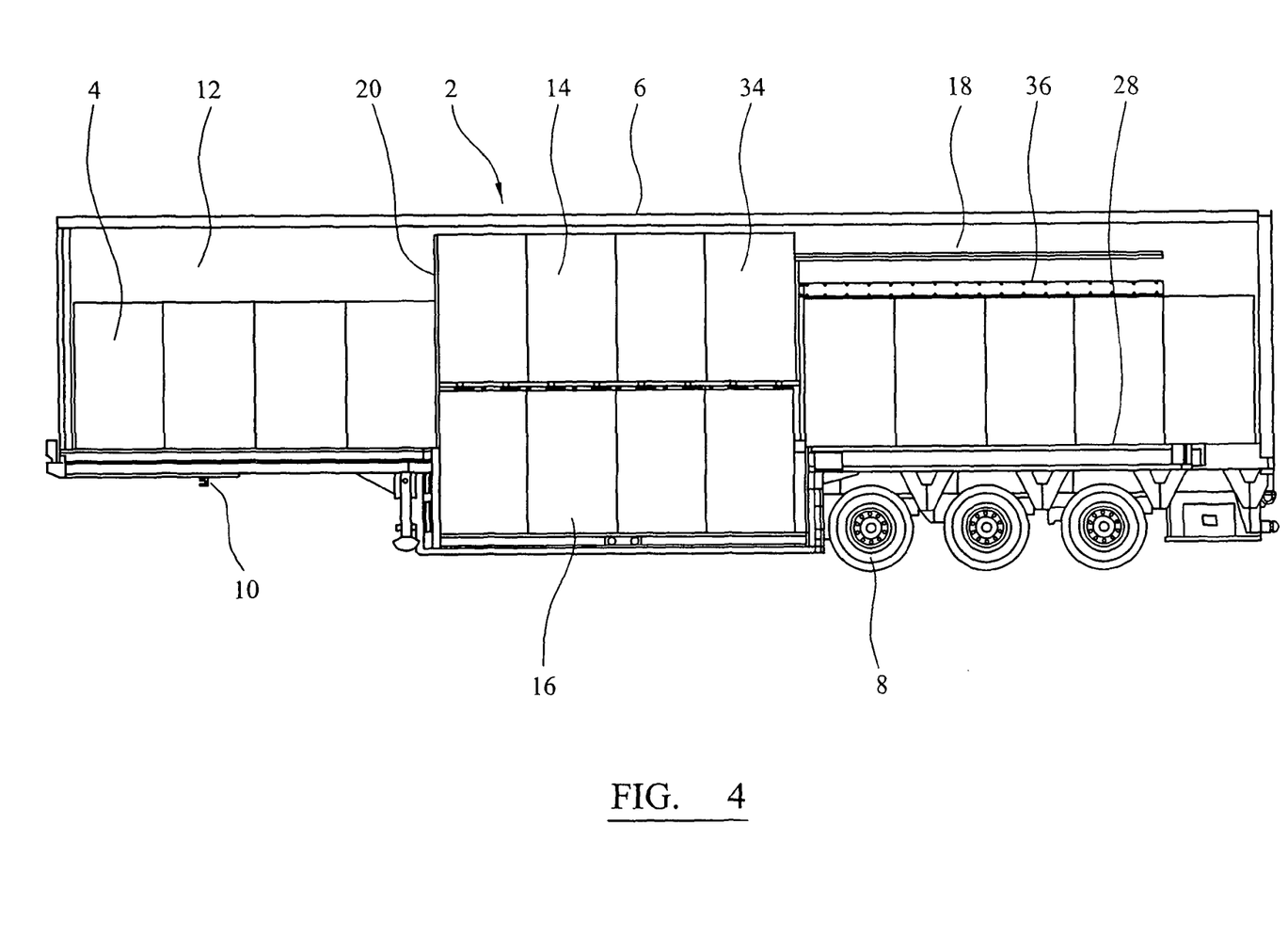

Referring now to FIG. 2, the first airbag apparatus 22 is deflated to lower the well deck 24 to the bottom of the well 16, and the second airbag apparatus 26 is inflated to raise both platforms 30, 32 of the rear deck assembly 28 so that the pins 54 in the upper platform 30 of the rear deck assembly 28 engage the recesses in the recessed plates 52 in the inner side walls 38 of the support 34. The support 34 is then moved a small amount in the rearward direction relative to the vehicle, to cause the pins 54 to engage the slots deeper portions 58 of the recesses behind the abutments 60 in the recesses. Referring now to FIG. 3, the rear airbag apparatus 26 is then deflated, as a result of which the upper platform 30 is held in position in the sidewalls 38 of the support 34, but the lower platform 32 returns to floor level. The support 34 is then moved forwards on the rails 36 in the internal surface of the sidewalls of the vehicle 2 by means of the rack and pinion gear arrangement 46, 48, 50 so that the support 34 together with its pallets 4 of goods is moved to a transport position above the goods in the well 16. The second gate (not shown) is then closed, and the remaining pallets 4 are then loaded onto the lower platform 32 of the rear deck assembly 28 and the rear doors of the trailer 2 closed for transport.

Figure 11:
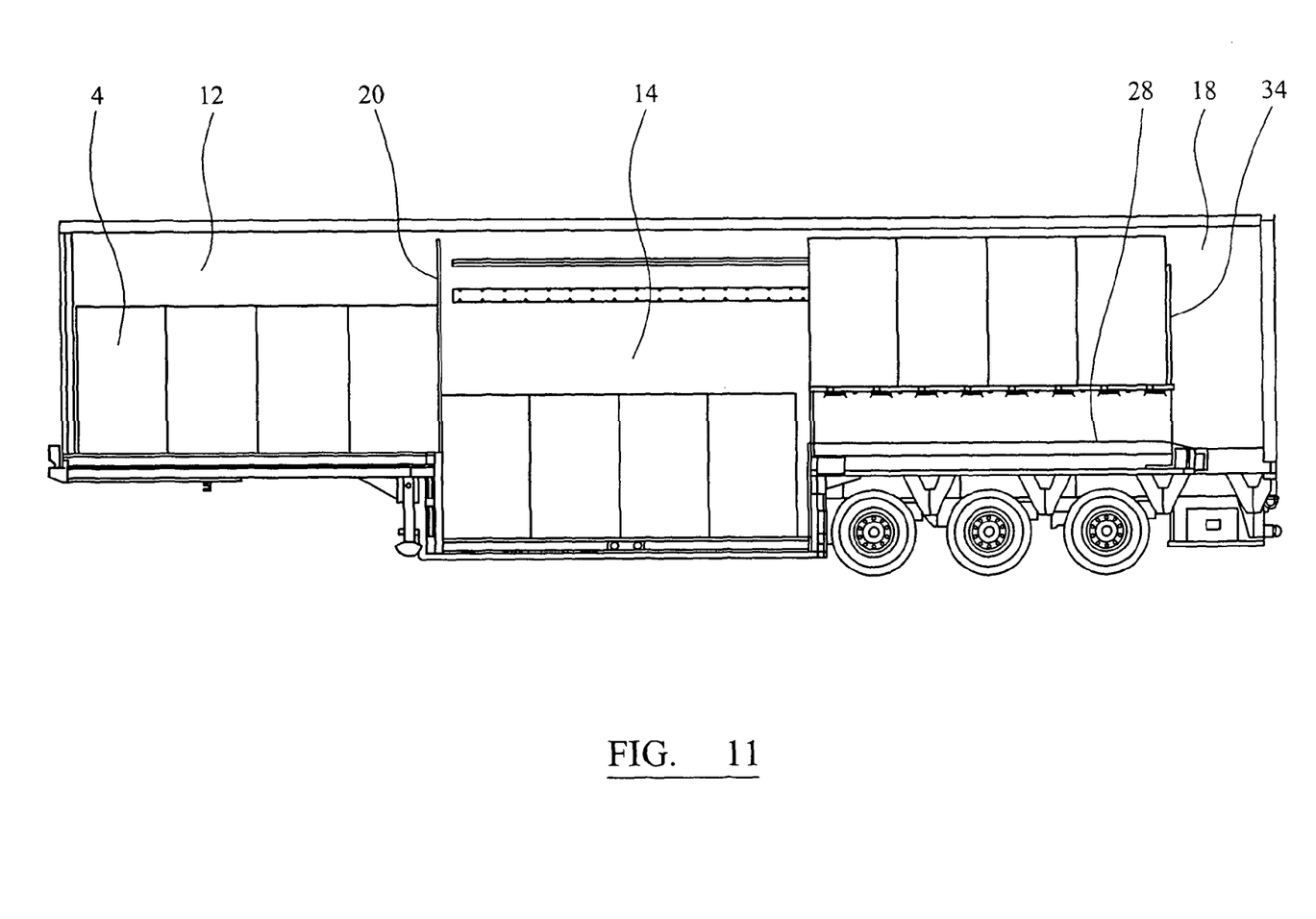
FIGS. 11 to 13 show an unloading sequence of the trailer of FIGS. 1 to 4.
Figure 12:
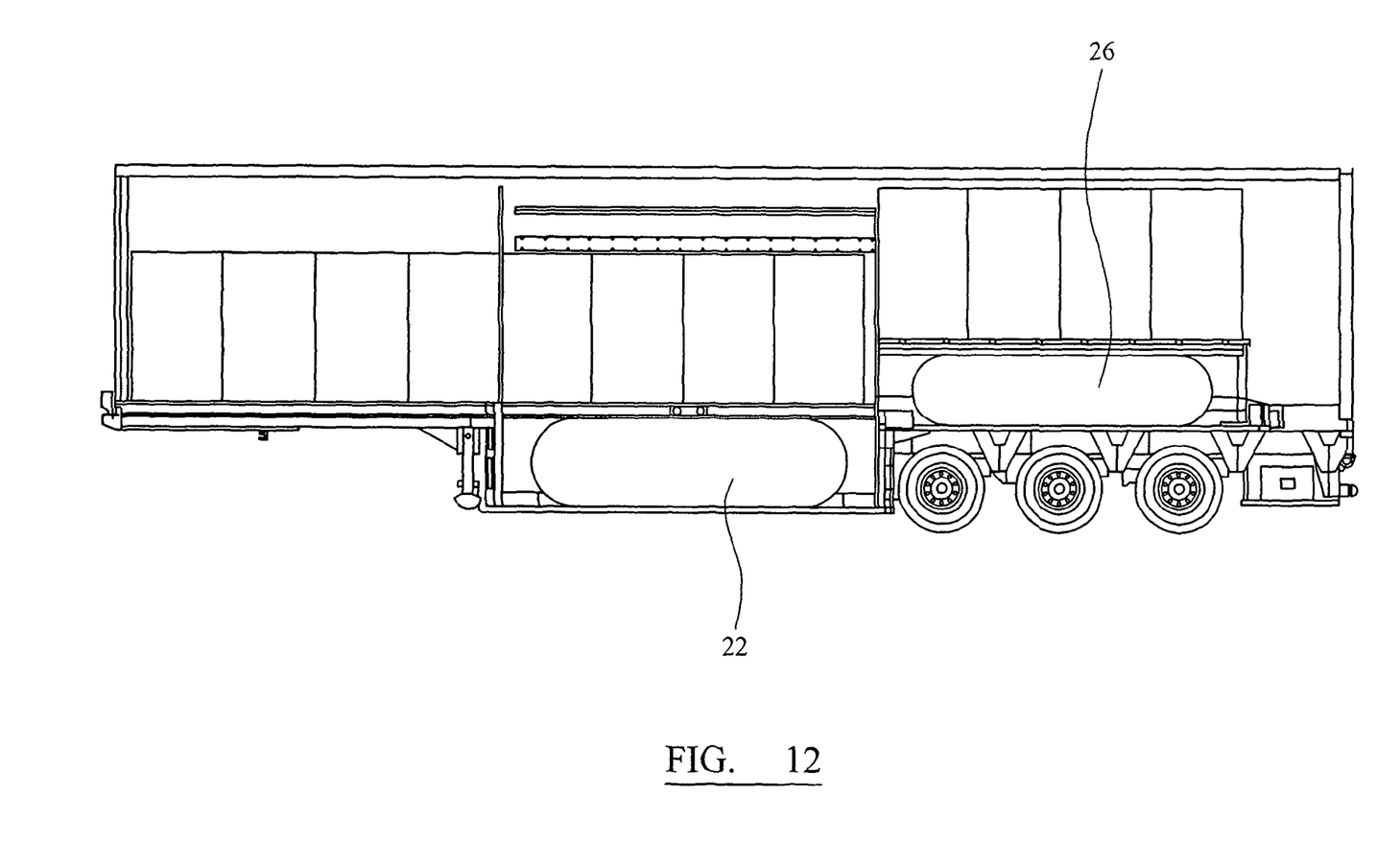
Figure 13:
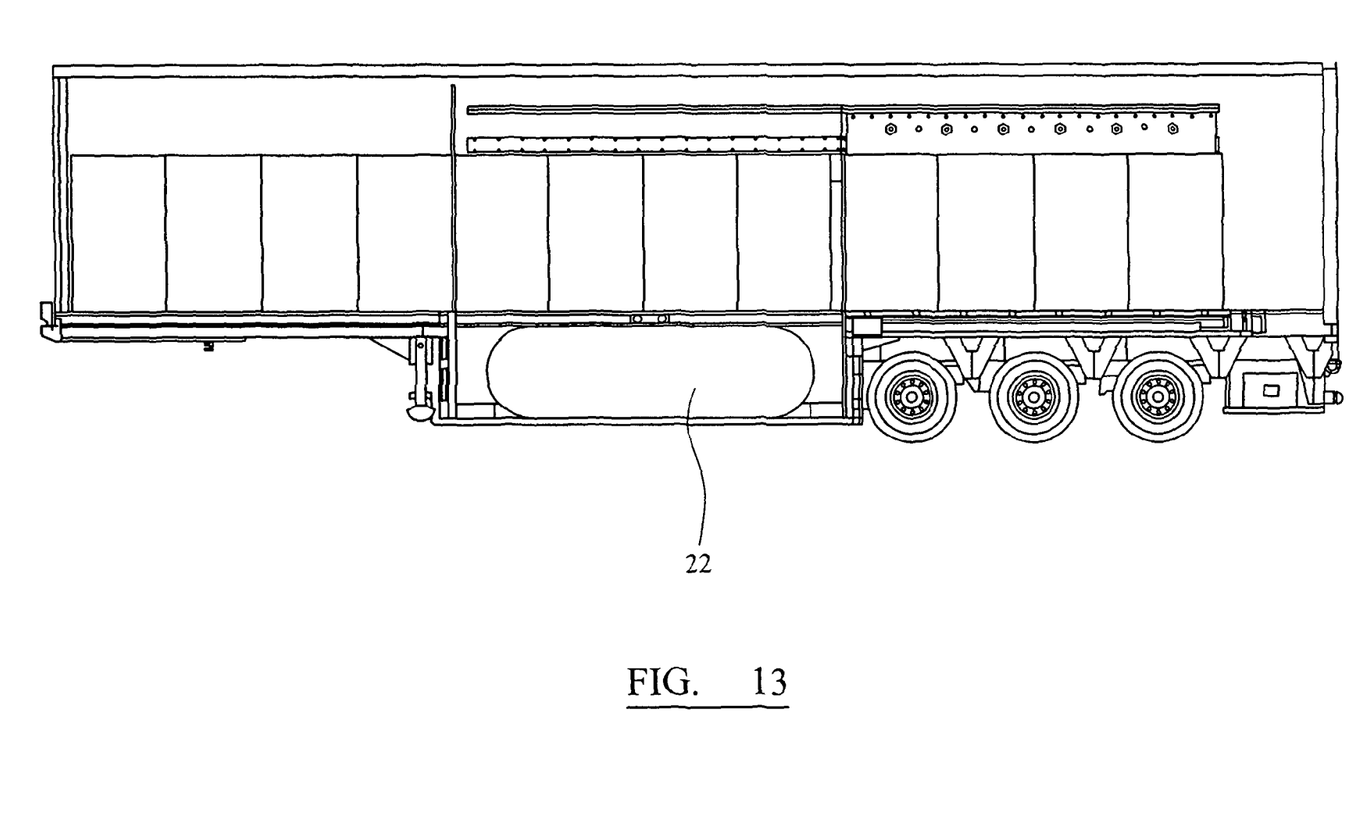

Referring now to FIGS. 11 to 13, in order to unload goods from the trailer 2, the sequence described with reference to FIGS. 1 to 4 is reversed. In particular, the pallets 4 are unloaded from the lower platform 32 of the rear deck assembly 28, and the support 34 moved rearwardly relative to the vehicle 2 to provide the arrangement shown in FIG. 11. The first 22 and second 26 airbag apparatus are then inflated to raise the well deck 24 and lower platform 32 of the rear deck assembly 28 respectively. This causes the upper platform 30 of the rear deck assembly 28 to be lifted out of engagement with the recesses of the recessed plates 52 of the support 34, and the support 34 is then moved forward slightly relative to the upper platform 30 as shown in FIG. 12. Referring now to FIG. 13, the second airbag apparatus 26 is then deflated, as a result of which the sprung pins 54 on the upper platform 30 of the rear deck assembly 28 slide over the corresponding inclined surfaces 56 in recessed plates 52 to disengage from the support 34 to enable both platforms 30, 32 of the rear deck assembly 28 to be lowered. The remaining pallets 4 located in the trailer can then be removed.

Figure 14:
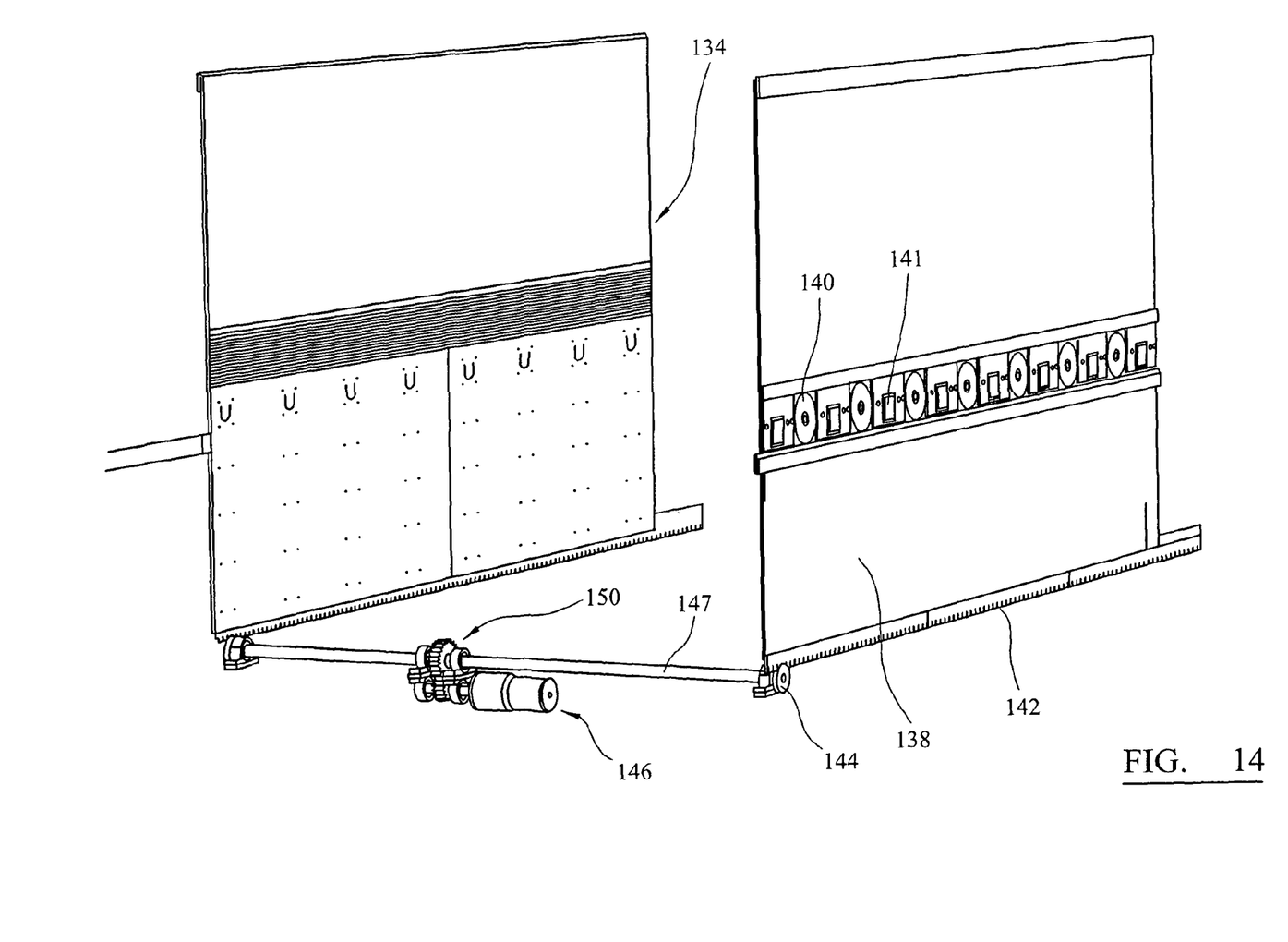
FIG. 14 is a perspective view of a drive mechanism and support of a second embodiment of the present invention.

A second embodiment of the present invention is shown in FIG. 14, in which parts common to the embodiment of FIGS. 1 to 13 are denoted by like reference numerals but increased by 100. Rack gears 142 at the lower edges of sidewalls 138 of support 134 are driven by corresponding pinion gears 144 coaxially mounted to a shaft 147 driven by a motor 146 via a gear train 150. By mounting the pinion gears 144 coaxially on common shaft 147, this enables the pinion gears 144 to be more effectively driven at the same rotational speed.

In addition, the tendency of the weight of the support 145 to cause the walls of the vehicle 2 to buckle is minimised in the arrangement of FIG. 14 by mounting the support 134 to the internal surface of the sidewalls of the vehicle 2 by means of rollers 140 provided at a height lower than the top of the support 134. Anti friction pads 141 made from a suitable low friction material are arranged between the rollers 140 to minimise resistance to sliding of the support 134 relative to the vehicle 2.

It will be appreciated by persons skilled in the art that the above embodiment has been described by way of example only, and not in any limitative sense, and that various alterations and modifications are possible without departure from the scope of the invention as defined by the appended claims.

The invention claimed is:

1. A load handling apparatus for handling goods in a vehicle, the apparatus comprising a support, comprising at least one first engaging device and adapted to support a first platform, having goods located thereon and comprising at least one second engaging device adapted to engage at least one said first engaging device to enable the support to support the first platform and goods located thereon, wherein the support is adapted to be mounted to the interior of a vehicle and to be moveable between a loading position and a transport position while supporting said first platform, and said first platform is adapted to be (i) moved, within said support, from a first position adjacent a floor of the vehicle, in which goods can be loaded onto or unloaded from the first platform, to a second position in which at least one said first engaging device engages a respective said second engaging device to enable the first platform to be supported by the support while the support moves to the transport position, and (ii) disengaged from said support in said second position and moved, within said support, to said first position; wherein the second position is higher than said first position, and wherein said transport position is forward of said loading position.

2. An apparatus according to claim 1, wherein said support includes a pair of sidewalls.

3. An apparatus according to claim 1, wherein at least one said first engaging device includes at least one respective recess for receiving a respective protrusion provided on the first platform.

4. An apparatus according to claim 3, wherein at least one said recess includes an inclined surface for engaging a respective said protrusion provided on the first platform to enable disengagement of said at least one first engaging device from a said second engaging device by means of movement of the first platform relative to the support.

5. An apparatus according to claim 3, wherein at least one said recess includes a respective abutment portion for retaining said first engaging device in engagement with a second engaging device in the transport position of the support.

6. An apparatus according to claim 1, further comprising at least one drive device for enabling movement of the support relative to the vehicle between the loading position and the transport position.

7. An apparatus according to claim 6, wherein said at least one drive device includes a respective rack and pinion gear mechanism.

8. An apparatus according to claim 7, wherein said rack and pinion gear mechanism includes a plurality of spaced apart pinion gears on a common shaft.

9. An apparatus according to claim 1, wherein at least one said second engaging device includes at least one said protrusion biased outwardly of said first platform.

10. An apparatus according to claim 1, further comprising a second platform adapted to be moved with the first platform when the first platform is moved from said first position to said second position, and to be disengaged from said first platform when the first platform is supported by the support.

11. A vehicle comprising a vehicle body and a load handling apparatus according to claim 1 mounted to the interior of the vehicle body and moveable between said loading position and said transport position.

* * * * *